2 Sheets—Sheet 1.

G. H. AMES.

CAR-COUPLING.

Reissued Oct. 31, 1876.

No. 7,366.

Witnesses:

Floyd Norris

Jno. D. Patten

Inventor:

Gillman H. Ames by Johnson & Johnson

Att'ys.

2 Sheets—Sheet 2.

G. H. AMES.

CAR-COUPLING.

No. 7,366.

Reissued Oct. 31, 1876.

Witnesses:

Floyd Norris

Jno. D. Patten

Inventor:

Gillman H. Ames, by Johnson & Johnson

Att'ys

UNITED STATES PATENT OFFICE.

GILLMAN H. AMES, OF ADRIAN, MICHIGAN.

IMPROVEMENT IN CAR-COUPLINGS.

Specification forming part of Letters Patent No. 156,326, dated October 27, 1874; reissue No. 7,366, dated October 31, 1876; application filed October 13, 1876.

*To all whom it may concern:*

Be it known that I, GILLMAN H. AMES, formerly of Fort Fairfield, Maine, but now of Adrian, in the county of Lenawee and State of Michigan, have invented certain new and useful Improvements in Car-Couplings, of which the following is a specification:

Coupling-bars which are constructed with subjacent hooks, with downwardly and rearwardly inclined front sides back of front slots, and heavier at their rear ends to maintain them in coupling positions, constitute one part of my invention. The coupling is effected by means of the bar with the connecting-hook being raised by the end of the other bar striking the inclined front side of and passing under its hook, and, when coupled, the fulcrum formed by the elevated or upper bar resting on the front end of the lower bar is at a point where the hook of one bar engages with the slot of the other bar to maintain the coupling secure. These coupling-bars may vary in length, and should be of sufficient weight to give them the required strength and durability. The draw-heads are provided with curved or inclined side slots, into which project side pins or arms of the coupling-bars, for co-operation in coupling and uncoupling.

Figure 1:
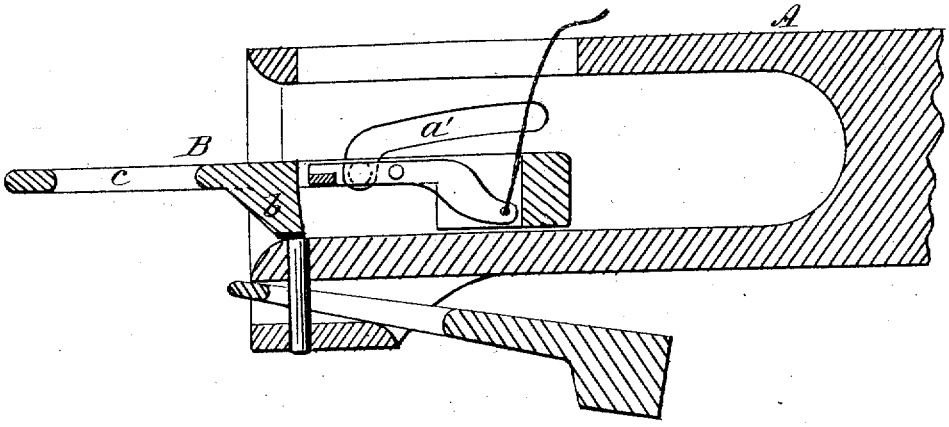
Figure 2:
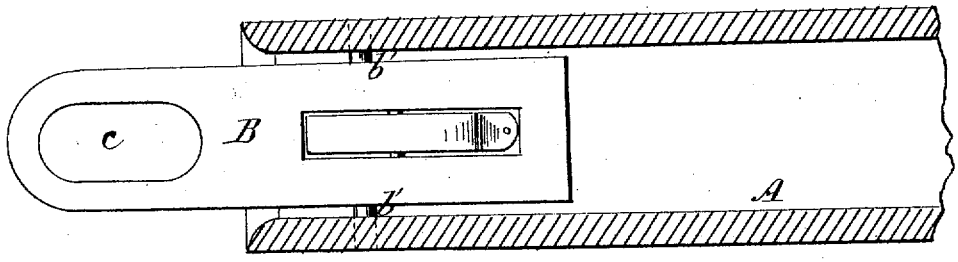
Figure 3:
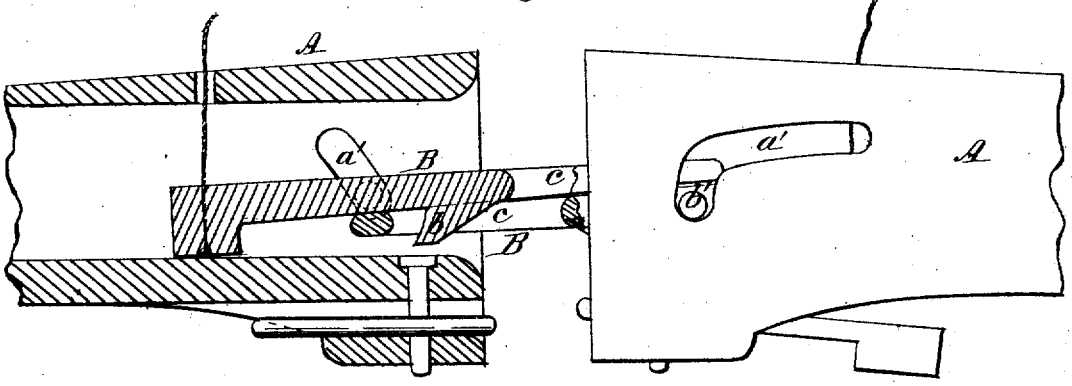
Figure 4:
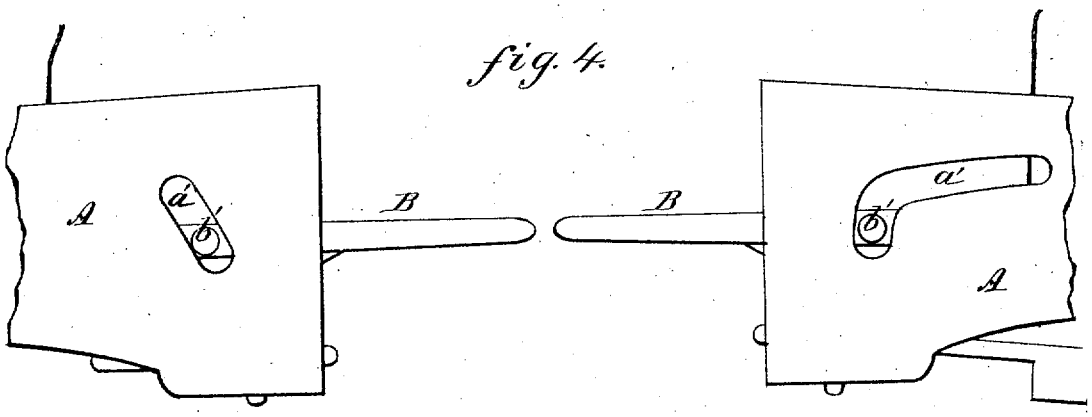
Figure 5:
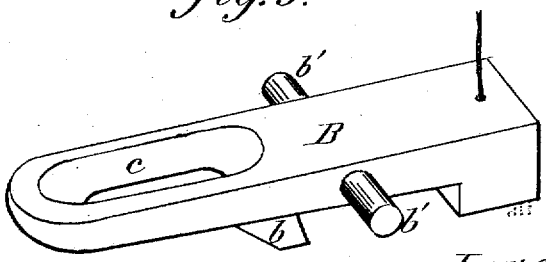

In the accompanying drawings, Figure 1 represents a vertical section of a draw-head with my improved coupling-bar applied thereto; Fig. 2, a horizontal section taken above the coupling-bar. Fig. 3 shows two draw-heads with the coupling-bars coupled, one draw-head being in section and the other in elevation. Fig. 4 shows the same with the coupling-bars as they remain when uncoupled, and Fig. 5 one of the coupling-bars.

The draw-heads A are constructed with central openings to allow of the proper adjustment and operation of the coupling-bars. The coupling-bars B are of similar size and form, the front end of each being provided with a slot, *c*, and back of this slot, on the under side of the bar, is a hook or prong, *b*, inclined backward, so that, in the act of coupling, the under bar is readily pressed beneath said hook. The coupling-bar should be made heavier at its rear end, so as to maintain it in position for coupling, and the hook may rest upon the lower interior side of the draw-head, the coupling being effected by the entrance of the hook into the slot *c* from the under side of the bar. From each side of the coupling-bar extend strong arms *b'*, which may be merely projections or pins set in the bars. The side arms rest in side slots *a'* in the draw-heads in such manner as to allow the bar to be readily raised or lowered; but when the bars are left free they drop into horizontal positions, ready for coupling. The side slots are curved or inclined upward and rearward, and serve several advantageous purposes, which make them a very important part of my invention. They allow the upper coupling-bar to rise, so that the lower bar may pass under its hooks to make the coupling. They give the coupling-bars a tendency to draw downward, and thereby prevent the cars from being accidentally uncoupled. They allow the bars to have a receding movement when they come in contact with obstacles, thus breaking the force of the collision. They allow the bars to be thrown back in the draw-heads when they are not wanted to form a coupling.

The front ends of the coupling-bars are flattened and rounded, so as to easily slip by each other, and the side arms resting in the side slots admit of an oscillating as well as an upward and backward movement to the coupling-bars, and render it impossible to bring two cars together without the ends of the bars passing each other, while the front end of the lower bar strikes the inclined front side of the hook of the upper bar, raising it, so that the end of the lower bar may pass under until the hook of the upper bar drops into the slot *c* of the lower bar, thus completing the connections. The security of the connection between the upper and lower bar is maintained by its being effected at a point where the upper bar is received upon the front end of the lower bar.

This complete device may be made, in whole or in part, of iron and steel, as may be deemed best.

To uncouple the cars the rear end of the bar is raised by means of a chain, which is attached to that end of the bar.

If desired, the rear end of the coupling-bar may be raised by means of a lever pivoted to the coupling-bar back of its hook, to which lever the uncoupling-chain may be attached.

A supplemental coupling-link may be arranged in a lower chamber for the purpose of using a coupling-pin, if desired.

I claim—

1. Coupling-bars for railway-cars, each having a subjacent hook, with a downwardly and rearwardly inclined front side back of its front slot, and a weighted rear end to automatically couple and maintain the connection, as herein set forth.

2. The combination, with the curved or inclined side slots of the draw-heads, of a coupling-bar having side arms, which work in said slots, substantially as and for the purpose herein set forth.

3. A coupling-bar for railroad-cars having the front slot, the subjacent hook, and the side arms, in combination with the curved or inclined side slots in the draw-head, whereby said coupling-bar is adapted for operation, as herein set forth.

In testimony whereof I have affixed my signature in the presence of two witnesses.

GILLMAN H. AMES.

Witnesses:
A. E. H. JOHNSON,
J. W. HAMILTON JOHNSON.